UNITED STATES PATENT OFFICE.

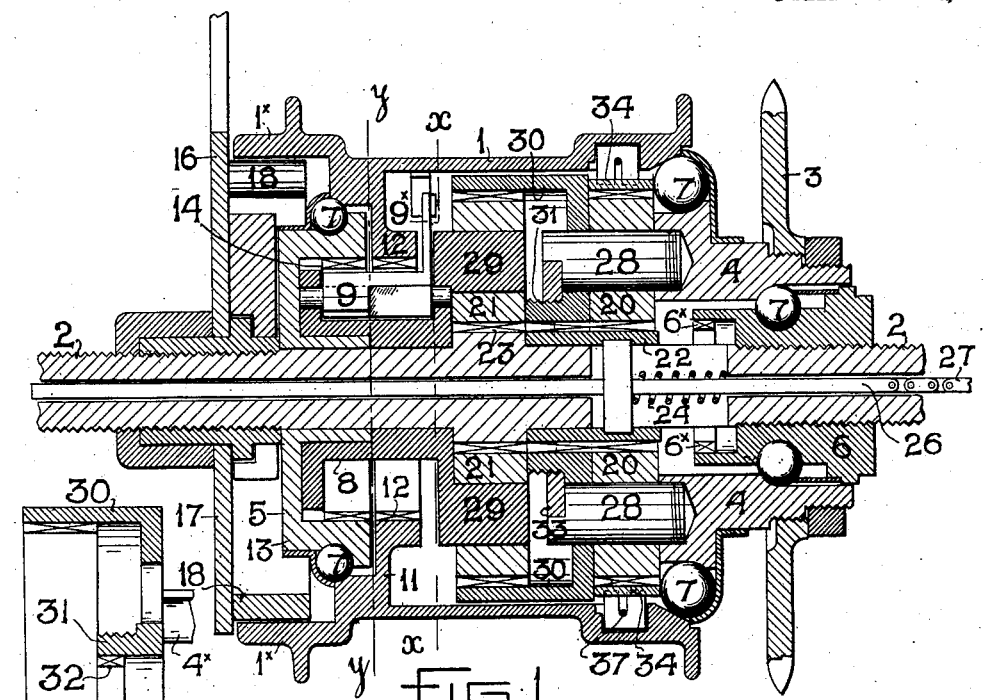

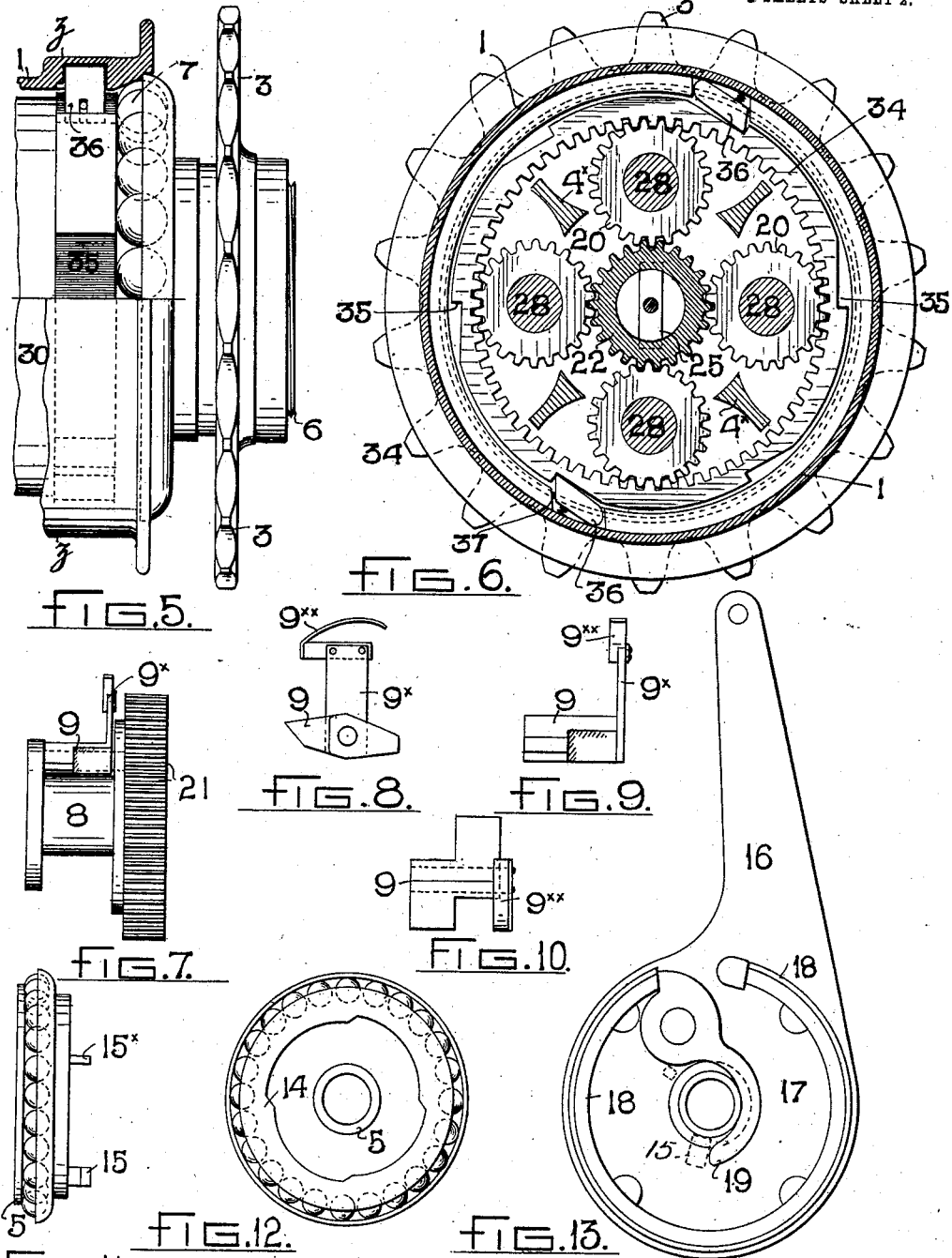

JAMES ARCHER, OF PETERBOROUGH, ENGLAND.

DRIVING AND BRAKE MECHANISM FOR VELOCIPEDES.

994,359.  Specification of Letters Patent.  Patented June 6, 1911.

Application filed March 20, 1906. Serial No. 307,075.

*To all whom it may concern:*

Be it known that I, JAMES ARCHER, a subject of the King of Great Britain and Ireland, and resident of Peterborough, England, have invented certain new and useful Improvements in Driving and Brake Mechanism for Velocipedes, of which the following is a specification.

This invention relates to differential driving gear and brake mechanism for velocipedes, and its chief object is the application to the hub of a bicycle wheel of planetary differential driving gear capable of giving three speeds, "high," "low," "normal," and further the combination with the said gear of a back-pedaling brake, the manner in which the gear and brake are combined being such that, on the gear being rotated in one direction for any speed, it will drive the hub forward; on being held stationary, while the machine is in use and on any speed, it will allow the hub to run free; and on being rotated in the opposite direction, while the hub continues to rotate and on any speed, it will apply the brake.

Another feature of the combination is that on the machine being wheeled backward, the brake will not be applied, no matter what the position of the gear.

A further object of the invention, in some cases, is so to arrange the planetary gear that the driving member will always be in gear with the "low" gear and thus prevent slipping of the pedals when changing from one speed to another; and another object, in all cases, is to operate the brake through the "low" gear, and thus cause the power by which the brake is applied to be the greatest and the same for all speeds.

In carrying out the invention, use is made within the bicycle wheel hub of any suitable arrangement of planetary gear giving three speeds, but preferably that hereinafter described, and use is also made of a back-pedaling brake of any suitable type, but preferably an expanding rim brake.

To that part of the planetary gear which transmits the "low" speed to the hub (hereinafter called the planet cage) is applied a swiveling or tilting double-armed pawl or dog. Upon the interior of the hub, or a bush or flange therein, is formed a ring of ratchet teeth, and upon a loose bush (hereinafter called the brake bush) within the hub, is formed a further ring of ratchet teeth, the two rings of teeth lying, by preference, side by side, and one being arranged to engage (or be engaged by) one arm of the aforesaid pawl when the pawl is tilted in one direction, and the other being arranged to engage (or be engaged by) the other arm of the pawl when the pawl is tilted in the reverse direction. The teeth in the brake bush are set in an opposite direction to those in the hub, and they are preferably fewer in number.

Adjacent to, and designed to be operated by the brake bush, is the brake, which normally remains out of action, but on the bush being rotated backward is brought into action and the movements of the hub retarded. In one with the swiveling pawl is a small lever arm, and applied to such arm is a suitable drag friction device, such as a small spring blade or collar, which, by contact with say the interior face of the hub, or other relatively non-moving, slower-moving or quicker-moving part, serves, when the gears are rotated in one direction, to tilt the pawl and cause it to engage the teeth of the hub and then drive the hub forward, or when rotated in the opposite direction to tilt the pawl and cause it to engage the brake bush and apply the brake, while on the machine being wheeled backward the pawl will not apply the brake, the pawl at such time being tilted out of engagement with the teeth of the brake bush. Similarly, when the machine is wheeled forward (not pedaled) the pawl will be held clear of the teeth of the hub.

In some cases the pawl will only drive forward the hub for one or two speeds only, the hub being driven forward for the other speed or speeds by parts of the speed gearing. In other cases the pawl will transmit all three speeds.

In applying the invention to two speed gearing, the pawl is combined with the low gear and both speeds are transmitted through the said pawl, while the pawl applies the brake for both speeds, as well as allows for free-wheeling, and the wheeling backward of the machine without applying the brake.

As applied to a single speed hub, the invention consists in combining the pawl with the driver, and operating the brake by such pawl.

Upon the accompanying drawings, Figure 1 illustrates to a magnified scale a longitudinal section of the hub of a bicycle with the preferred form of the invention, i. e., with the special three-speed gear, shown applied thereto, the parts being in the position they occupy when giving the "normal" gear. Fig. 2 illustrates a transverse section on line x—x, looking toward the left-hand end of the hub. Fig. 3 illustrates a like section on line y—y. In these views the tilting pawl is shown in the position it occupies when the machine is being driven forward (or wheeled backward), see Fig. 2, and in the position it occupies when the brake is being applied, see Fig. 3. Fig. 4 illustrates a longitudinal section of a portion of an important part of the speed gear, hereinafter referred to. Fig. 5 illustrates a side exterior elevation (partly sectional) of the right-hand end of the hub, and Fig. 6 illustrates a transverse section on line z—z. Fig. 7 illustrates (to a smaller scale then Fig. 1, about natural size) a front exterior elevation of the planet cage, and also the pinions and pawl carried by such cage, separate from the hub. Figs. 8, 9 and 10 illustrate side, edge and plan views respectively of the tilting pawl to the same scale as Fig. 1. Fig. 11 illustrates an edge view, and Fig. 12 an inner face or side view (to a smaller scale) of the brake bush, and Fig. 13 illustrates an inner face view of the expanding brake.

Referring now to Figs. 1 to 13, the numeral (1) designates the hub of the wheel to which the gear and brake are applied. (2) is the fixed axle of the hub, and (3) the sprocket or chain wheel mounted on the part (4), hereinafter called the driver. The hub and driver take their bearings upon the bushes (5) (6) via balls (7). The bush (5) is the brake bush hereinbefore referred to, which is free to rotate on the axle (2), while the bush or cone (6) is a fixture.

(8) is the planet cage forming the last member of the three-speed gear, and upon which is axially mounted the double pawl or dog (9) forming the chief feature of the invention, the axis (10) of the pawl being fixed to the cage as shown, and the pawl being fre to tilt or oscillate about such axis in the plane of the hub's rotation.

(11) is an annular and inwardly turned projecting flange in one with, or secured to the hub, and (12) are ratchet teeth formed in the inner periphery of such flange, see Fig. 2.

(13) is an overhanging or lateral projecting flange on the brake bush (5) which upon its interior periphery has ratchet teeth (14). As shown, the two flanges lie adjacent to one another and both over-lie the pawl (9).

As shown more clearly in Figs. 2, 3, 8, 9 and 10, the pawl (9) has two working edges, arms or ends, one pointing in one direction and the other in the opposite direction, and one lying in the plane of the flange (11) and the other lying in the plane of the flange (13), see Figs. 1 and 10. In one with the pawl is a short arm ($9^x$) which extends toward the hub barrel and at its free end carries a spring ($9^{xx}$) adapted to gently press against the inner face of the hub or other suitable part. As aforesaid, the brake bush (5) is loosely mounted on the axle (2). Upon one of its side faces is a stud (15) and alongside such face, and held stationary by an arm (16) secured to the bicycle frame, is a plate (17), upon which is mounted an expandible brake rim (18). Such rim, when the several parts are assembled, lies within and normally clear of the cylindrical end ($1^x$) of the hub. Upon the face of the plate (17) is a brake lever (19), one arm of which bears against the free end of the brake rim, while its other arm lies against the boss of the plate and its free end comes immediately opposite the stud (15) on the bush (5) as shown dotted in Fig. 13. A further and smaller pin ($15^x$) on the bush (5), and lying against the lever boss, may be used to insure of the pin (15) always lying against the end of the lever. With the parts thus formed and assembled and the gear in action, the effect of rotating the planet cage (8) in the forward direction is (assuming the pawl (9) is in the position shown in Fig. 3) to cause the pawl to tilt on its axis (10) until the end of the pawl engages the ratchet teeth (12), see Fig. 2, when it transmits the motion of the gear to the flange (11), and consequently to the hub, in the forward direction.

Upon the rider holding the pedals stationary when riding, the planet cage (8) remains stationary while the hub (1) and flange (11) continue to rotate. With such holding of the planet cage stationary the axis of the pawl (9) is also held stationary, and therefore as the hub continues to rotate the friction on the arm ($9^x$) tilts the pawl to the position shown in Fig. 13, or until its other end presses against the ratchet teeth (14) in the brake bush (5). Thus, while driving the hub, or while stationary, the pawl (9) has no effect on the brake bush. Immediately, however, the rider back-pedals, the pawl (9) rotates the brake bush, which, acting through stud (15) upon the lever (19), brings about the expanding of the brake rim against the hub and the retardation of the further movements of the wheel. Upon allowing the pedals to move forward the brake is taken off, while on the gear being again driven forward the pawl is again tilted and again caused to engage the teeth in the hub flange as shown in Fig. 2.

Of course, the pawl will not invariably serve to drive forward the hub for each speed (other devices forming part of the speed gearing being used for some of the speeds, preferably the "high" and "normal"), but for all three speeds the gearing will act through the pawl on the brake bush. When the gearing for the "high" or "normal" speeds is in action the hub flange (11) will over-run the pawl, which will then simply slip over the teeth of the flange.

When wheeling the machine backward the hub becomes the driver, and, therefore, due to the drag on arm (9ˣ) causes the pawl (9) to remain in mesh with the teeth of the hub flange (11), in which position it cannot affect the brake.

I will now proceed to describe the arrangement of three speed gearing with which I prefer to use the tilting double-armed pawl. In such gearing there are two sets of planet pinions (20) and (21) and two sun pinions (22) (23), the latter being made solid with the axle (2), and the former being separate and free to slide to and fro along the axle (2) under the controlling action of a spring (24), a cross-bar (25), rod (26) and chain (27) connected to a suitable gear changing device on or about the handle bar of the bicycle. Such sun pinion (22) in one position is held stationary while in two others it is free to revolve. The pinions (20), which mesh with the sun pinion (22), are mounted upon axes (28) carried by the driver (4), and the pinions (21), which mesh with the sun pinion (23), are mounted upon axes (29) carried by the planet cage (8). In one with the driver (4) through the medium of distance pieces (4ˣ) is a gear ring or cylinder (30), with which the pinions (21) mesh, and in one with which is a boss (31). Upon the interior of such boss is a ring of teeth (32), see Fig. 4, corresponding to those in the sliding sun pinion (22). A ring or hoop (33) fitting into the cut away parts of the axes (28) serves to keep the said axes from working loose. Surrounding the pinions (20) is a loose gear ring or sleeve (34) which, upon its interior periphery, is formed with gear teeth, and upon its exterior periphery is formed with ratchet teeth (or recesses) (35), see Fig. 6. In recesses in the hub are pawls (36) held therein in any suitable manner, but say by a wire spring (37) sprung into a bifurcated part of each pawl, and lying within an annular recess extending all around the interior of the hub as shown. Upon the inner face of the inner end of the fixed bearing cone (6) are clutch teeth (6ˣ) corresponding to those in the sun pinion (22).

The change of gear or speed is brought about by varying the position of the sun pinion (22). In one position of the pinion i.e., with its teeth engaging the teeth in the bearing cone (6), and therefore stationary, the hub (through the driver (4), axes (28), pinions (20), gear ring (34) and pawls (36)) is driven at the high speed, the gear ring (30) being also rotated, and rotating the planet cage and pawl (9) but at a slower speed than the hub, and the flange (11) therefore over-running the pawl (9). In another position of the pinion (22), i. e., free from either the teeth (6ˣ), or teeth (32), the hub (through the driver (4), axes (28), pinions (20) and gear ring (30), pinions (21), axes (29), planet cage (8) and pawl (9)) is driven at the low speed. In the last position of the pinion (22) i. e., with its teeth in gear with those of the pinions (20) and the teeth (32) on the gear ring boss (31), the hub (through the driver (4), axes (28), pinions (20) and the gear rings (30) and (34), which are then clutched to each other and rotate as one, and also through the pawls (36)) is rotated at the normal speed.

At all times it will be seen that the low gear is always in driving connection through the studs 28 with the device and that at no time can the bicycle pedals slip or make a sudden movement when changing from one gear or speed to another, as is usual with known speed gears. It will also be seen that due to the manner in which the gear ring 34 drives the hub for the "high" and "normal" gears through the pawls 36, and the manner in which the pawl 9 drives the hub for the "low" gear, the hub can run free with each speed. We would also point out that, by reason of the pawl 9 being carried by the planet cage 8, the brake power always acts through the "low" gear, and is therefore the same for all three speeds, besides also being applied in the best possible manner.

While preferring the construction of three speed gearing herein described and while also preferring to transmit the low speed through the pawl 9, I wish it to be understood that I do not restrict my invention to any such constructions or method of transmitting the motion, as other constructions and methods may be adopted, the main requirement being to transmit the forward motion of some or all of the gears through the double-ended pawl, and by such pawl allow of the pedals being held stationary while the wheel runs free without applying the brake, and also by such pawl allow of the brake being applied when the pedals are rotating backward, and further, allow of the machine being wheeled backward without applying the brake.

What I claim is:—

In driving and brake mechanism for velocipedes and the like, a wheel hub having a ring of ratchet teeth within it, a brake-operating bush and brake also within the hub, the brake-operating bush having a ring of ratchet teeth lying alongside those in the hub but arranged in a direction opposite to that of the hub teeth, and a differential driving gear at that end of the hub farthest removed from the brake, said gear comprising two trains of planet pinions and two sun pinions therefor, one of which sun pinions is fixed and the other capable of being moved longitudinally and in some positions of being rotated, a driving or rotary member carrying the axes of one set of pinions and a rotary planet cage carrying the axes of the other set of pinions, and having clutch teeth with which the teeth of the movable sun pinion may engage, a gear ring meshing with this last named set of pinions, which latter in turn mesh with the fixed sun pinion, and which said gear ring is carried by the axes of the other set of pinions, a gear sleeve with ratchet teeth in its periphery carried by the driving member and designed to surround and gear with the planet pinions carried by such member, pawls in the hub of the wheel with which said gear sleeve is designed to engage, a fixed axle for the hub and an element having clutch teeth fixed to said axle and with which the teeth of the sun pinion may engage, in combination with a swiveling double-ended pawl having a radial arm and pivotally carried by the planet cage, and a frictional "drag" device within the hub and engaging the arm of the pawl, the said pawl being adapted to tilt under the rotation of the planet cage and in one direction of such rotation engage and drive forward the hub, and in the reverse direction of rotation engage the brake bush and apply the brake, and said pawl also adapted to allow the driving gear to remain stationary while the hub continues to rotate, or allow the hub to be rotated backward without applying the brake, substantially as set forth.

In witness whereof, I have hereunto set my hand in the presence of two witnesses.

JAMES ARCHER.

Witnesses:
 JOSEPH LAZOUBY.
 ELI FARROW.

---

Copies of this patent may be obtained for five cents each, by addressing the "Commissioner of Patents, Washington, D. C."